United States Patent
Nakajima

(10) Patent No.: US 7,233,445 B2
(45) Date of Patent: Jun. 19, 2007

(54) METHOD OF MANUFACTURING MICROLENS ARRAY

(75) Inventor: Toshihiro Nakajima, Hamamatsu (JP)

(73) Assignee: Yamaha Corporation (JP)

(*) Notice: Subject to any disclaimer, the term of this patent is extended or adjusted under 35 U.S.C. 154(b) by 0 days.

(21) Appl. No.: 10/768,024

(22) Filed: Feb. 2, 2004

(65) Prior Publication Data
US 2004/0156112 A1  Aug. 12, 2004

(30) Foreign Application Priority Data
Feb. 7, 2003  (JP) .............................. 2003-030908

(51) Int. Cl.
*G02B 27/10* (2006.01)

(52) U.S. Cl. ..................................... 359/619

(58) Field of Classification Search ......... 359/619–626
See application file for complete search history.

(56) References Cited

U.S. PATENT DOCUMENTS

| | | | | |
|---|---|---|---|---|
| 5,166,824 A | * | 11/1992 | Nishiguchi et al. | 359/456 |
| 5,204,160 A | * | 4/1993 | Rouser | 359/738 |
| 5,225,935 A | * | 7/1993 | Watanabe et al. | 359/619 |
| 5,505,804 A | * | 4/1996 | Mizuguchi et al. | 156/154 |
| 6,034,779 A | * | 3/2000 | Yamaura | 356/614 |
| 6,724,536 B2 | * | 4/2004 | Magee | 359/619 |
| 6,818,934 B1 | * | 11/2004 | Yamamoto | 257/294 |
| 6,911,684 B2 | * | 6/2005 | Yamamoto | 257/294 |
| 6,982,833 B2 | * | 1/2006 | Nemoto | 359/626 |
| 2002/0001695 A1 | * | 1/2002 | Tajima et al. | 428/138 |

FOREIGN PATENT DOCUMENTS

| | | | |
|---|---|---|---|
| JP | 07-174903 | | 7/1995 |
| JP | 08179299 A | * | 7/1996 |
| JP | 10-062606 | | 3/1998 |
| JP | 2000260970 A | * | 9/2000 |
| JP | 2004145058 A | * | 5/2004 |
| JP | 2005115175 A | * | 4/2005 |
| WO | WO 2004099829 A2 | * | 11/2004 |

OTHER PUBLICATIONS

English translation of Chinese Office Action (issued Feb. 18, 2005).

* cited by examiner

*Primary Examiner*—Alicia M Harrington
(74) *Attorney, Agent, or Firm*—Dickstein, Shapiro, LLP

(57) ABSTRACT

A positive resist layer formed on a translucent substrate is subjected to exposure and development to form circular resist patterns disposed near each other at a predetermined distance. The exposure pattern has an opening of a plurality of circular ring shape surrounding the plurality of resist patterns. The opening may have a width equal to the predetermined distance. Since the width of the opening is constant over the whole outer periphery of each resist pattern, uniform exposure can be realized at all positions along the periphery to form a perfect circle shape. After a convex lens shape is given to each resist pattern by heating and reflow process, the convex lens shape is transferred to the substrate by dry etching process using the resist patterns as a mask to form a microlens array with convex lenses.

13 Claims, 6 Drawing Sheets

METHOD OF MANUFACTURING MICROLENS ARRAY

CROSS REFERENCE TO RELATED APPLICATION

This application is based on and claims priority of Japanese Patent Application No. 2003-030908 filed on Feb. 7, 2003, the entire contents of which are incorporated herein by reference.

BACKGROUND OF THE INVENTION

A) Field of the Invention

The present invention relates to a microlens array manufacture method which transfers lens shapes to a transparent substrate or underlying layer by etching using a resist pattern as a mask, and to a microlens array produced.

B) Description of the Related Art

A microlens array having regularly aligned microlenses is used in a photocoupler for an optical fiber array, an optical integrated circuit, a solid state imager, an optical system of an electronic copy machine, a liquid crystal display and the like. According to a conventional manufacture method for such a microlens array, circular positive resist patterns are formed and changed to convex lens shapes by heating and reflow process, and thereafter the convex lens shapes of the positive resist patterns are transferred to a substrate by a dry etching process (for example, refer to Japanese Patent Laid-open Publication No. HEI-7-174903).

With this method, as shown in FIG. 7, on one principal surface of a quartz substrate 1, a necessary number of circular positive resist patterns 2a to 2d are disposed in line. Each resist pattern is spaced from other resist patterns so as not to contact each other. The regions outside the circular patterns 2a to 2d are exposed to leave un-exposed circular patterns. Next, the resist patterns 2a to 2d are heated and reflowed to form convex lens shapes (spherical convex shapes) by a surface tension. Thereafter, by using the resist patterns 2a to 2d as a mask, the substrate is dry-etched to transfer the lens shapes of the resist patterns to the principal surface of the substrate. In this manner, a microlens array can be formed on the substrate 1, having convex lenses of circular plan shapes linearly aligned in correspondence with the resist patterns 2a to 2d.

Generally, a larger exposure energy is required at a narrower exposure line (or area) width, when resist patterns are formed by subjecting a positive resist layer to exposure and development process. If the exposure area is narrower, a higher exposure energy is needed to transfer the mask image at a high fidelity. In the example shown in FIG. 7, a larger exposure energy is required at a position nearer to the center line Lc intersecting the centers of the resist patterns 2a to 2d. An exposure process is performed at such an exposure energy as proper resist patterns are formed on the center line Lc. With this setting, although proper exposure is performed on the center line Lc along an X direction, the exposure line (or area) width becomes broader at a position remoter from the center line Lc in a Y direction perpendicular to the X direction, resulting in excessive exposure. Proper resist patterns in conformity with the reticle patterns cannot be obtained.

FIG. 8 shows cross-section of a convex lens La formed on the substrate 1 by transferring the resist pattern 2a, the convex lens La corresponding to the resist pattern 2a formed by the above-described method. Lx and Ly indicate the cross section of the lens La along the X and Y directions. As described above, although the lens pattern 2a is subjected to proper exposure on the center line Lc along the X direction, excessive exposure is performed along the Y direction away from the center line Lc. The lens La is not a perfect circle, and the radius of curvature in the X direction becomes larger than that in the Y direction. Thus, a focal point Py in the Y direction becomes nearer to the substrate than a focal point Px in the X direction. A focal length difference (astigmatism) between the sagittal direction (X direction) and the meridional direction (Y direction) becomes large so that the optical characteristics are degraded.

SUMMARY OF THE INVENTION

An object of this invention is to provide a micro lens array manufacture method capable of preventing deformation of a lens plan shape.

According to one aspect of the present invention, there is provided a method of manufacturing a microlens array comprising the steps of: forming a positive resist layer on one principal surface of a translucent substrate; subjecting the positive resist layer to exposure process and development process to form a plurality of circular resist patterns disposed near each other at a predetermined distance, in which the exposure process is performed by using an exposure pattern allowing to form an opening of a ring shape surrounding the plurality of circular resist patterns and thereafter the development process is performed; giving each of the plurality of resist patterns a convex lens shape by heating and reflow process; and transferring the convex lens shape of each of the plurality of convex lenses to the principal surface of the translucent substrate by dry etching process to form a microlens array having circular convex lenses corresponding to the plurality of resist patterns on the principal surface of the translucent substrate.

An exposure line width along an outer periphery of each resist pattern is almost constant. Almost uniform exposure is possible along the outer periphery of each resist pattern at an exposure energy determined by the constant exposure line width. Deformation becomes small under the uniformed conditions. A better circle pattern can be obtained for each resist pattern.

Since a convex shape is given to each resist pattern, it is possible to form a better circle convex lens on the substrate surface. A convex lens having the equal radius of curvature in all directions has an equal focal length in all directions.

A difference between focal lengths in the sagittal and meridional directions can be reduced considerably so that a microlens array having good optical characteristics can be realized.

DESCRIPTION OF THE PREFERRED EMBODIMENTS

FIGS. 1A, 2, 3 and 4 illustrate a microlens array manufacture method according to an embodiment of the invention. Processes (1), (2), (3) and (4) corresponding to FIGS. 1A, 2, 3 and 4 will be described in this order. FIGS. 1A, 2, 3 and 4 correspond to cross sectional views taken along line R–R' shown in FIG. 5.

Figure 1A:
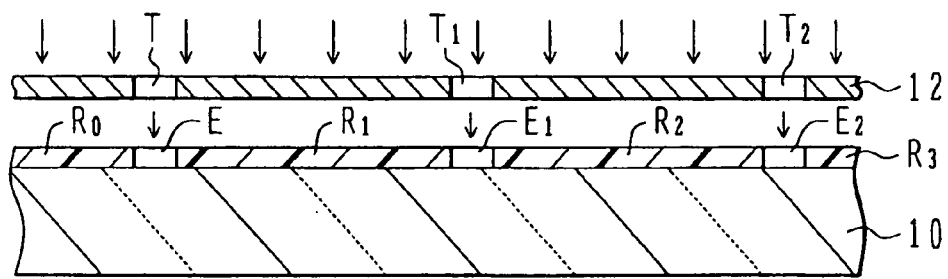
FIGS. 1A, 2, 3 and 4 are cross sectional views illustrating main processes of a microlens array manufacture method according to an embodiment of the invention.

(1) On one principal surface of a quartz substrate 10, a positive resist layer $R_0$ is formed by spin coating or the like. As shown in FIG. 1A, the positive resist layer $R_0$ is selectively exposed by using a 1:1 exposure apparatus such as a proximity aligner and an exposure mask 12.

Figure 5:
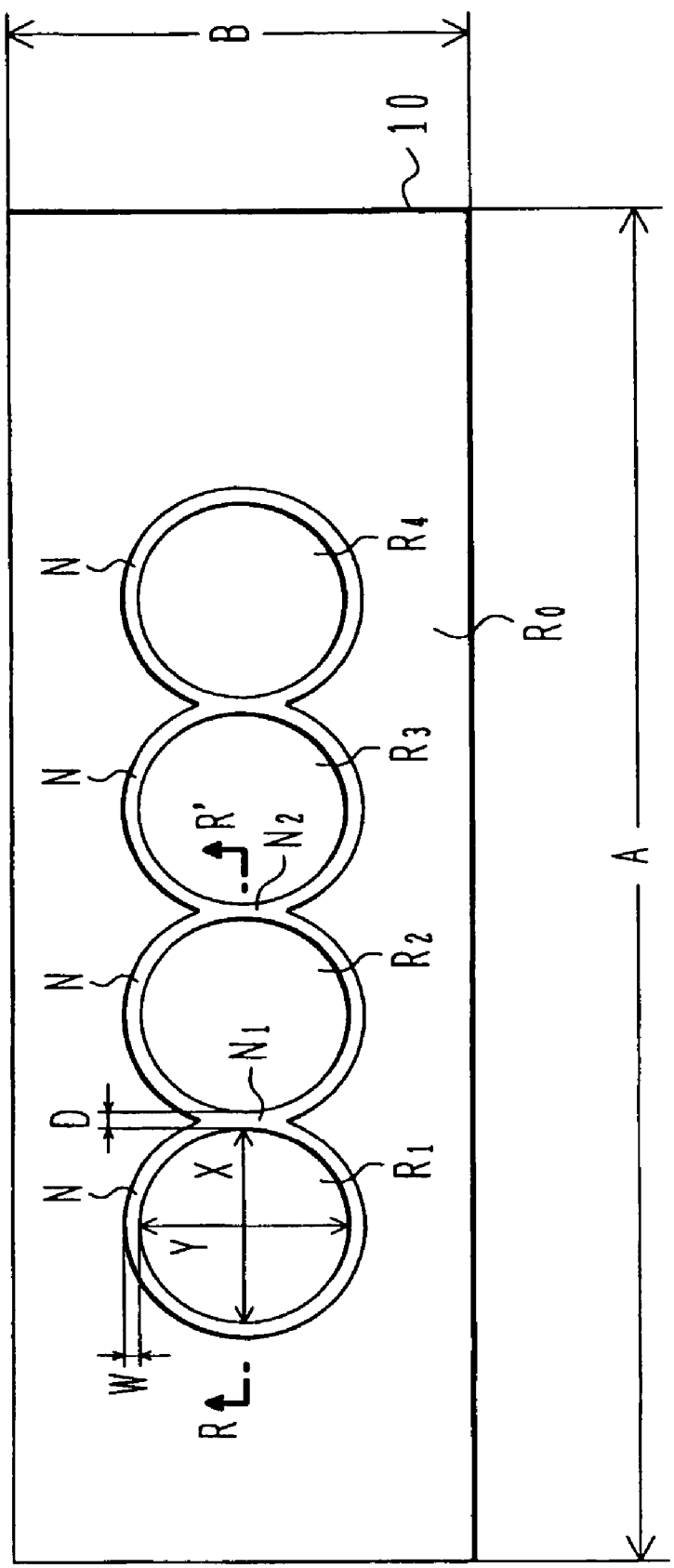
FIG. 5 is a plan view of resist patterns at the process shown in FIG. 2.

The exposure mask 12 has, as shown in FIG. 5, a translucent area T corresponding to an opening N having the shape of a chain of rings. A partial area $T_1$ of the translucent area T corresponds to an opening $N_1$ between positive resist patterns $R_1$, and $R_2$, and another partial area $T_2$ of the translucent area T corresponds to an opening $N_2$ between positive resist patterns $R_2$ and $R_3$.

Figure 1B:
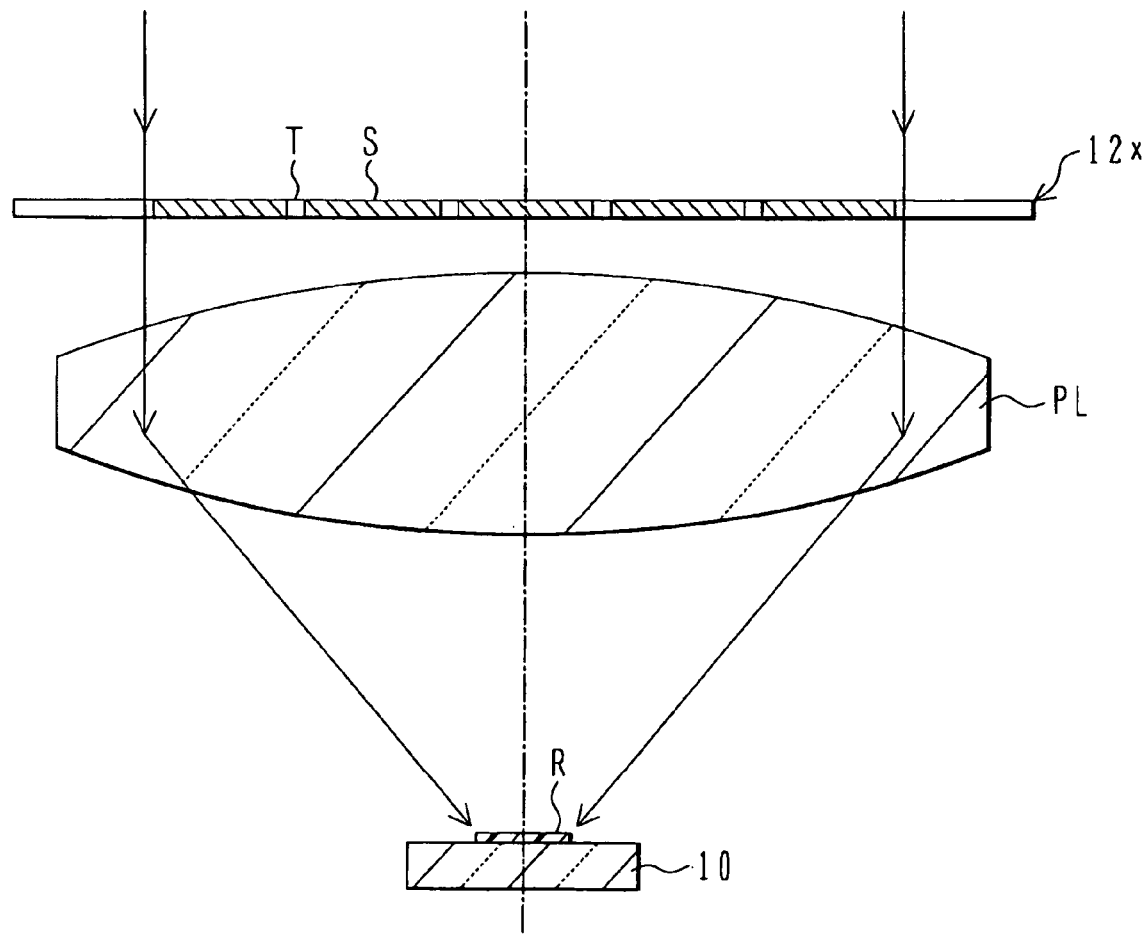
FIG. 1B is a schematic diagram showing a reducing projection stepper apparatus.

Other types of aligners may be used in place of the 1:1 aligner. FIG. 1B is a schematic diagram showing a reduction projection aligner. If a reduction projection aligner is used, an exposure mask 12x is a mask scaled up from the exposure mask 12 shown in FIG. 1A by a fivefold, tenfold or the like, and has an analogous translucent area T and a light shielding area S. The translucent area T has the shape of a chain of rings similar to that shown in FIG. 5. A projection lens PL reduces the size of patterns on the exposure mask 12x by one fifth, one tenth or the like and projects the patterns on a substrate 10.

Figure 2:
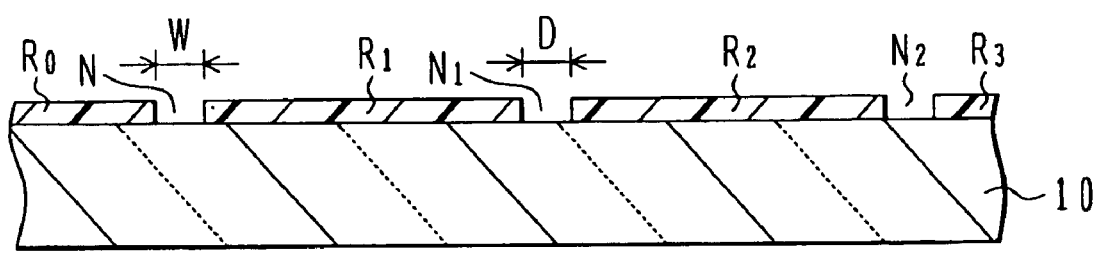

The positive resist layer $R_0$ is exposed by an exposure pattern corresponding to the translucent area T of the exposure mask 12. An exposed area E of the positive resist layer $R_0$ corresponds to the translucent area T, and exposed areas $E_1$ and $E_2$ correspond to the partial areas $T_1$ and $T_2$ of the translucent area T. The exposed area E having the shape of a chain of rings and corresponding to the opening N shown in FIG. 5 surrounds the partial areas (patterns) $R_1$ to $R_4$ in the ring shape. (2) The exposed positive resist layer $R_0$ is developed to remove the resist in the exposed areas E. As shown in FIGS. 2 and 5, resist patterns are therefore formed which are constituted of the positive resist areas $R_0$ to $R_4$. The resist patterns have the opening N having the shape of a chain of rings and corresponding to the exposed area E.

The resist patterns $R_1$ to $R_4$ are disposed near each other at a predetermined distance D. The distances in proximate areas between the resist patterns $R_1$ and $R_2$, between the resist patterns $R_2$ and $R_3$, and between the resist patterns $R_3$ and $R_4$ are all D. The opening N surrounds the resist patterns $R_1$ to $R_4$ in a ring shape and has a width W equal to the distance D. For example, assuming that the length A and width B of the rectangular substrate 10 are 3 mm and 1.5 mm, D and W can be set to 8 μm and the diameter of each of the resist patterns $R_1$ to $R_4$ can be set to 496 μm.

In the exposure process shown in FIG. 1A, an exposure pattern forming the opening N having the shape of a chain of rings is used so that an exposure line width along the outer periphery of each of the resist patterns $R_1$ to $R_4$ becomes constant or D. By setting an exposure energy determined from this constant exposure line width, uniform (not excessive nor insufficient) exposure can be performed at any position along the outer periphery of each resist pattern. Representing the direction of a center line connecting the centers of the resist patterns $R_1$ to $R_4$ by an X direction and the direction perpendicular to the X direction by a Y direction, each of the resist patterns $R_1$ to $R_4$ is a perfect circle having the same diameter in both the X and Y directions.

(3) The resist patterns $R_0$ to $R_4$ are heated and reflowed to make the resist patterns $R_1$ to $R_4$ have a convex lens shape. All the resist patterns $R_1$ to $R_4$ have a surface shape in conformity with the surface tension (and gravitation force). The lens top surface is slightly higher than the upper level of the resist pattern $R_0$.

Figure 4:
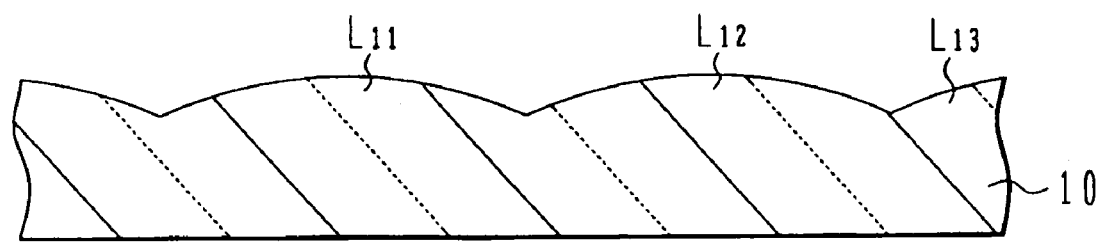

(4) By using the resist patterns $R_0$ to $R_4$ as a mask and a dry etching process using gas such as $CF_4$ and $CHF_3$, the convex lens shapes of the resist patterns $R_1$ to $R_4$ are transferred to one principal surface of the substrate 10. In this manner, a microlens array is formed which has four linearly disposed convex lenses corresponding to the resist patterns $R_1$ to $R_4$ on one principal surface of the substrate 10. FIG. 4 shows three convex lenses $L_{11}$ to $L_{13}$ among the four convex lenses. Each convex lens formed in the above manner has a perfect circle corresponding to a perfect circle pattern of each of the resist patterns $R_1$ to $R_4$, has the same radius of curvature in both the X and Y direction and has the same focal length in both the sagittal direction and meridional direction. A linear microlens array having the good optical characteristics can therefore be obtained.

Figure 6:
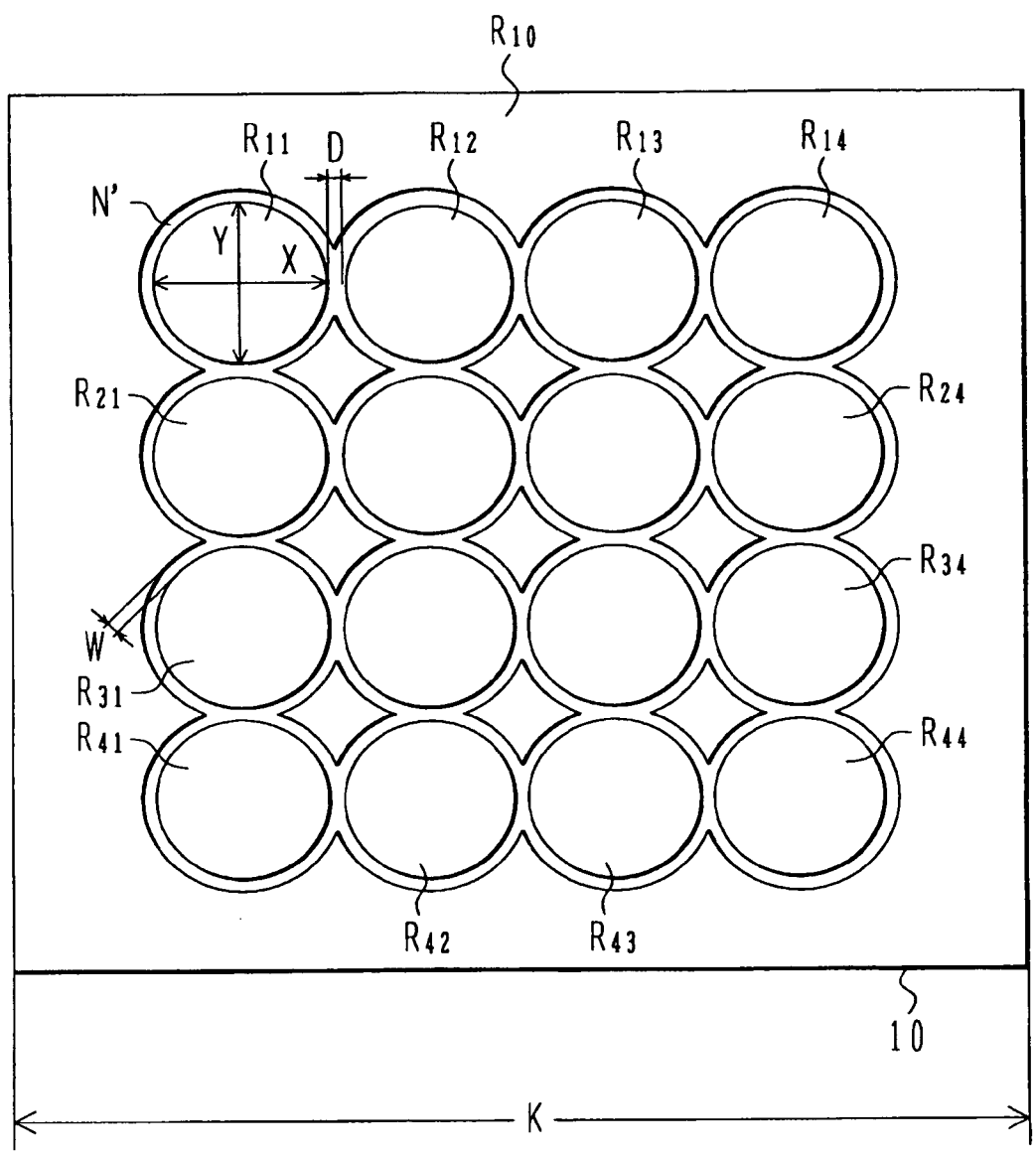
FIG. 6 is a plan view of resist patterns to be used when a two-dimensional microlens array is manufactured.
Figure 7:
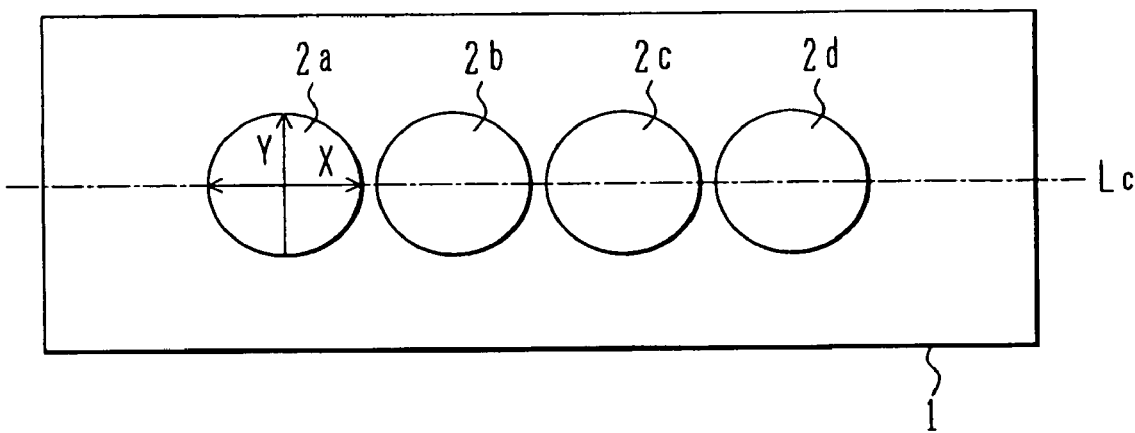
FIG. 7 is a plan view of resist patterns formed by a conventional microlens array manufacture method.
Figure 8:
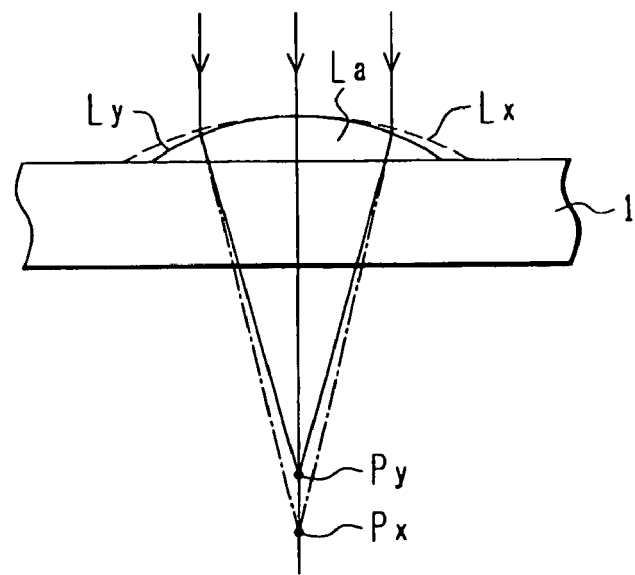
FIG. 8 is a cross sectional view of a lens manufactured by using the resist pattern shown in FIG. 7.

FIG. 6 is a diagram showing resist patterns to be used for manufacturing a two-dimensional microlens array. A two-dimensional microlens array can be manufactured easily by changing only the size of the quartz substrate 10 and resist patterns used by the linear microlens array manufacture method described with reference to FIGS. 1A to 5.

The substrate 10 may by a quartz substrate of a square shape having a side K of 6 mm. On one principal surface of the substrate 10, a positive resist layer $R_{10}$ is formed in the manner similar to that described with reference to FIG. 1A. The positive resist layer $R_{10}$ is subjected to an exposure and development process to form sixteen resist patterns $R_{11}$ to $R_{14}$, $R_{21}$ to $R_{24}$, $R_{31}$ to $R_{34}$, and $R_{41}$ to $R_{44}$ in a two-dimensional layout (matrix layout). All the resist patterns $R_{11}$ to $R_{44}$ have a perfect circle.

The resist patterns $R_{11}$ to $R_{14}$ are disposed near each other at a predetermined distance D along the X direction. Similar to the resist patterns $R_{11}$ to $R_{14}$, the resist patterns $R_{21}$ to $R_{24}$, $R_{31}$ to $R_{34}$, and $R_{41}$ to $R_{44}$ are also disposed near each other at the predetermined distance D. The resist patterns $R_{11}$ to $R_{41}$ are disposed near each other at the predetermined distance D along the Y direction perpendicular to the X direction. Similar to the resist patterns $R_{11}$ to $R_{44}$, the resist patterns $R_{12}$ to $R_{42}$, $R_{13}$ to $R_{43}$, and $R_{14}$ to $R_{44}$ are also disposed near each other at the predetermined distance D. An exposure process is performed by an exposure pattern having an opening N' which surrounds the resist patterns $R_{11}$ to $R_{44}$ in a ring shape and has a width W equal to the distance D, and then a development process is performed. In this manner, the plan shapes of all the resist patterns $R_{11}$ to $R_{44}$ can be made perfectly circular. For example, D and W can be set to 10 μm and the diameter of each of the resist patterns $R_{11}$ to $R_{44}$ can be set to 990 μm.

The resist patterns $R_{22}$ to $R_{44}$ are heated and reflowed to make the resist patterns $R_{11}$ to $R_{44}$ have a convex lens shape. By using dry etching process, the convex lens shapes of the resist patterns $R_{11}$ to $R_{44}$ are transferred to one principal surface of the substrate 10. In this manner, a microlens array is formed which has sixteen two-dimensionally disposed convex lenses corresponding to the resist patterns $R_{11}$ to $R_{44}$ on one principal surface of the substrate 10. Each convex lens formed in the above manner has a perfect circle corresponding to a perfect circle pattern of each of the resist patterns $R_{11}$ to $R_{44}$, has the same radius of curvature in both the X and Y direction and has the same focal length in both the sagittal direction and meridional direction. A two-dimensional microlens array having the good optical characteristics can therefore be obtained.

In the above-described embodiment, the distance D between the lenses is equal to the exposure ring width W.

Figure 9A:
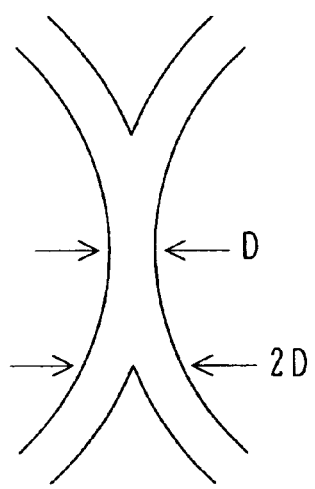
FIG. 9A is a partial enlarged view of FIG. 5.

FIG. 9A is an enlarged view of a connection area between rings. Although the width of the exposure area at the most proximate position of lenses is D, the exposure width broadens to about 2D at the upper and lower positions of the proximate area. Since a change in the exposure area width is a twofold at the most, a high exposure precision can be realized.

Figure 9B:
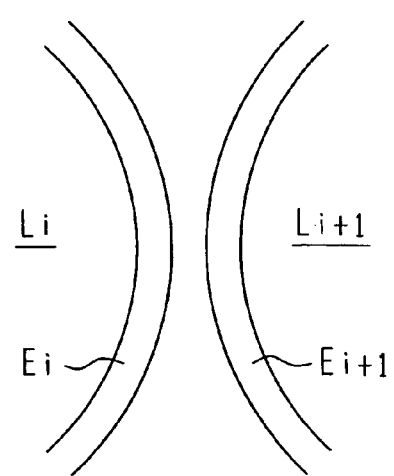
FIG. 9B is a partial plan view showing a modification of resist patterns.

FIG. 9B is an enlarged view of rings according to a modification of the embodiment which can improve the exposure precision. Exposure areas $E_i$ and $E_{i+1}$ surrounding the rings are circular rings separated from each other. Lens areas $L_i$ and $L_{i+1}$ are surrounded by the circular rings $E_i$ and $E_{i+1}$ having the equal width so that the exposure conditions can be made more uniform.

Figure 3:
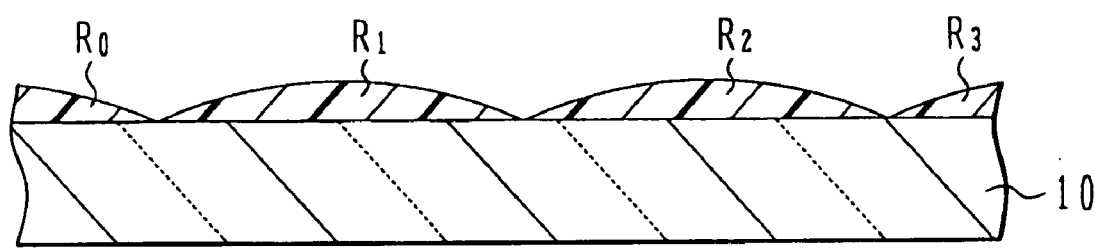

In FIGS. 3 and 4, the resist patterns flow slightly during the reflow process and the ring openings are drawn distinguished. The ring openings may be left.

Figure 10A:
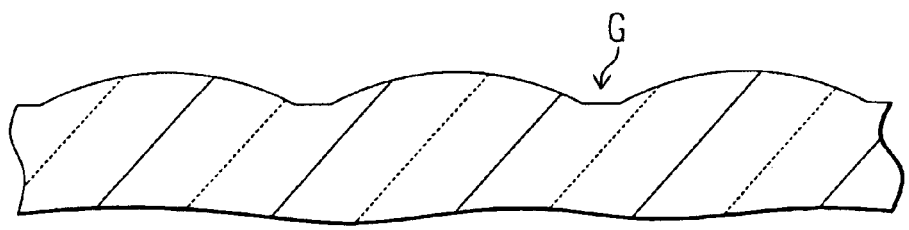
FIGS. 10A and 10B are cross sectional views showing a modification of a lens shape.

FIG. 10A shows the state that the opening is left around the lens resist patterns and a groove G in the shape of a chain of rings is left around the finished lenses.

Figure 10B:
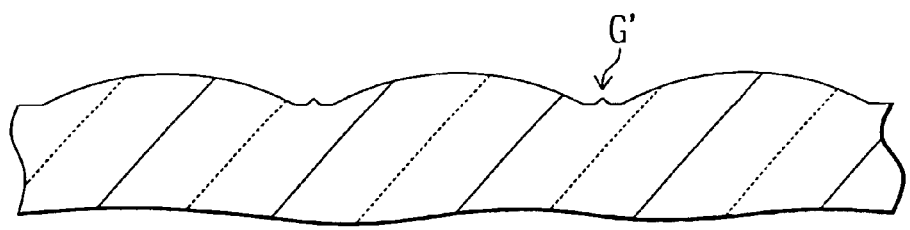

FIG. 10B shows the state that the separated circular ring openings shown in FIG. 9B are left around the microlens array as grooves G'.

The substrate may either a bulk substrate or a laminated substrate having an upper layer for forming a lens array.

The present invention has been described in connection with the preferred embodiments. The invention is not limited only to the above embodiments. It will be apparent to those skilled in the art that other various modifications, improvements, combinations, and the like can be made.

I claim:

1. A microlens array comprising:
   a translucent substrate;
   a plurality of lenses formed on one principal surface of said translucent substrate and disposed separated by a predetermined distance; and
   a circular ring groove surrounding each of said plurality of lenses,
   wherein a distance D between adjacent ones of said plurality of lenses and a width W of the groove surrounding each lens are equal to one another;
   and wherein each lens has a plan shape of a circle and has the same radius of curvature in perpendicular X and Y directions relating to the principle surface.

2. The microlens array according to claim 1, wherein said groove is formed integrally in the shape of a chain of rings.

3. A microlens array comprising:
   a translucent substrate;
   a plurality of lenses formed on one principal surface of said translucent substrate and disposed separated by a predetermined distance; and
   a circular ring groove surrounding said plurality of lenses, wherein said groove is formed separately for each of said plurality of lenses.

4. A microlens array comprising:
   an inorganic translucent substrate having a principal surface and a rear surface;
   a plurality of lenses formed in said principal surface of said inorganic translucent substrate capable of converging incident light to locations outside said substrate, the plurality of lenses being separated by a predetermined distance, said rear surface of said substrate serving as a light emitting surface; and
   a circular ring shaped groove surrounding each of said lenses, and formed in said principal surface of said substrate,
   wherein a distance D between adjacent ones of said plurality of lenses and a width W of the groove surrounding each lens are equal to one another;
   and wherein each lens has a plan shape of a circle and has the same radius of curvature in perpendicular X and Y directions relating to the principle surface.

5. The microlens array according to claim 4, wherein said lenses have a diameter of the order of hundreds of micron.

6. The microlens array according to claim 5, wherein said circular ring groove has a width of microns.

7. The microlens array according to claim 4, wherein said substrate is made of quartz.

8. The microlens array according to claim 4, wherein adjacent ones of said grooves are merged in a region where associated lenses approach each other.

9. An intermediate product for a microlens array comprising:
   an inorganic translucent substrate having a principal surface and a rear surface;
   a photoresist film formed on the principal surface of the translucent substrate;
   a chain of annular openings formed in the photoresist film, each of the annular openings leaving a photoresist pattern of perfect circular shape therein, wherein the distance between adjacent ones of the photoresist patterns is equal to the width of the annular opening.

10. The intermediate product for the microlens array according to claim 9, wherein said photoresist patterns have a diameter of the order of hundreds of micron.

11. The intermediate product for the microlens array according to claim 9, wherein said annular openings have a width of microns.

12. The intermediate product for the microlens array according to claim 9, wherein said substrate is made of quartz.

13. The intermediate product for the microlens array according to claim 9, wherein adjacent ones of said annular openings are merged in a region where associated photoresist patterns approach each other.

* * * * *